United States Patent [19]
Romantschuk et al.

[11] 3,876,756
[45] Apr. 8, 1975

[54] METHOD OF PREPARING POLYSULFIDE SOLUTION

[75] Inventors: Håkan W. Romantschuk; Jorma Kiimalainen, both of Tampere, Finland

[73] Assignee: Oy Tampella AB, Tampere, Finland

[22] Filed: Mar. 9, 1970

[21] Appl. No.: 17,616

[30] Foreign Application Priority Data
Mar. 12, 1969 Finland................................ 740/69

[52] U.S. Cl................................ 423/562; 423/574
[51] Int. Cl.. C01b 17/34; C01b 17/06; C01b 17/04
[58] Field of Search ....... 23/138, 226; 423/574, 562

[56] References Cited
UNITED STATES PATENTS

| | | | |
|---|---|---|---|
| 1,915,364 | 6/1933 | Harrell | 23/226 |
| 1,934,626 | 11/1933 | Nagelvoort | 23/138 |
| 1,941,623 | 1/1934 | Rosenstein | 23/226 |
| 1,955,722 | 4/1934 | Ahlgvist | 23/226 |
| 2,047,492 | 7/1936 | Reissmann et al. | 23/138 |
| 2,077,856 | 4/1937 | Rohm | 23/138 |
| 2,562,158 | 7/1951 | Wilde | 23/226 |
| 2,796,325 | 6/1957 | Bertozzi | 23/138 X |
| 3,023,088 | 2/1962 | Urban et al. | 23/226 |
| 3,284,162 | 11/1966 | Deal, Jr. et al. | 23/226 |
| 3,331,657 | 7/1967 | Peter et al. | 23/138 X |

FOREIGN PATENTS OR APPLICATIONS
599,073  3/1948  United Kingdom.................. 23/226

*Primary Examiner*—Edward Stern
*Attorney, Agent, or Firm*—Roylance, Abrams, Berdo & Kaul

[57] ABSTRACT

In this method hydrogen sulfide and sulfur dioxide are reacted with each other in a water phase at a temperature below 150°C to form a sulfur suspension, and the obtained sulfur is then reacted with a strong sodium sulfide solution. The sulfur formed in the first reaction is fed into a polysulfide reactor in the form of an unpurified suspension without separating the sulfur. However, the sulfur is conducted through a concentrator, in which the sulfur content of the suspension rises over 20 per cent of weight, advantageously to 50–60 per cent of weight, and the clear solution separated from it is returned to the sulphur preparing reactor.

1 Claim, 1 Drawing Figure

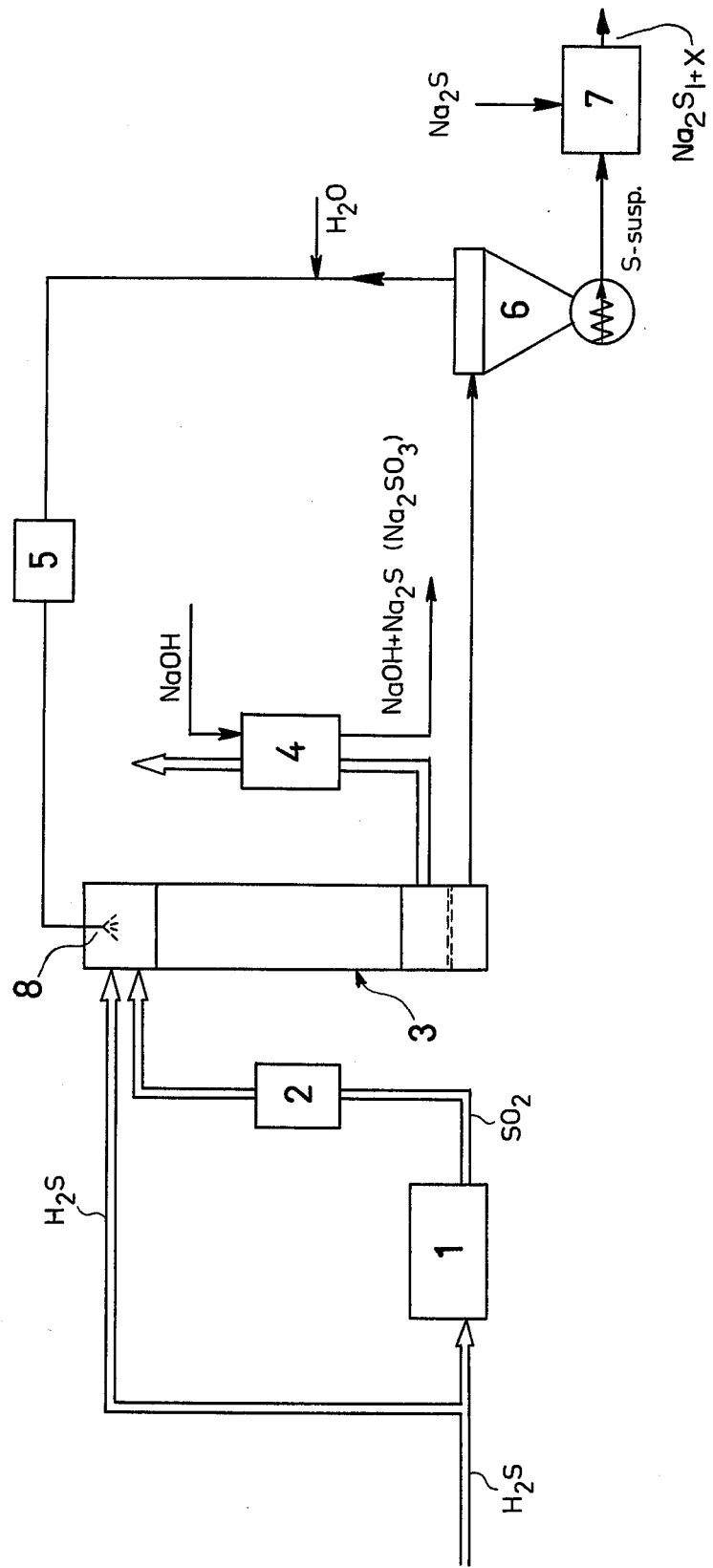

METHOD OF PREPARING POLYSULFIDE SOLUTION

BACKGROUND OF THE INVENTION

1. Field of the Invention

This invention relates to a method of preparing polysulfide solution to be added to cellulose cooking liquor.

2. Description of the Prior Art

Many similar methods are known, but their purpose has, however, been to prepare elemental sulfur. However, none of these previously known methods has led to an industrial application. The difficulty of separating the formed sulfur by filtration and the decrease of the yield caused by the formed poly-thio compounds have been mentioned as reasons for the failures.

The method so far used for preparing sulfur is the so-called Claus method, which, however, requires a special burning chamber in which high temperatures occur and in which hot gases have to be treated.

SUMMARY OF THE INVENTION

According to the invention $H_2S$ and $SO_2$ are reacted in a water phase at a temperature under 150°C to form a sulfur suspension, which is concentrated to a sulfur content over 20 per cent of weight, preferably 50–60 per cent of weight. The clear liquid formed on this concentrated suspension is recirculated to the sulfur producing step and the concentrated sulfur suspension is reacted with a strong sodium sulfide solution.

In this method it is simple to prepare polysulfide solution from the concentrated sulfur suspension, the yield is good, and it can be carried out with less expensive equipment than before and without having to prepare pure elemental sulfur as an intermediary product.

Hydrogen sulfide and sulfur dioxide are caused to react with each other either in a stoichiometric ratio or advantageously by using a small surplus of hydrogen sulfide, in which case the concentration of poly-thio compounds in the circulating liquid can be kept very low. The formation reaction of polythio compounds is a balance reaction, so that the concentration of this compound in the liquid can rise only to a certain level. This level can be kept low by adding reaction components in an essentially stoichiometric ratio.

According to the invention hydrogen sulfide and sulfur dioxide are advantageously fed cocurrently into a filling plate reaction vessel, for example, into such a reaction vessel as is described in the Italian Pat. No. 355 275.

The gases emerging from the reaction vessel are advantageously washed with some suitable alkaline liquid, for example, white liquor, which is then conducted back to the process. Thus the components that have not reacted can be recovered from the gases.

According to a particularly advantageous application of this method, a small amount of sodium sulfate or green liquor is added to the circulating liquid in order to speed up the sedimentation of sulfur.

BRIEF DESCRIPTION OF THE DRAWING

The FIGURE shows a schematical side view of an apparatus for carrying out the method according to the invention.

DESCRIPTION OF THE PREFERRED EMBODIMENT

The preparation of polysulfide solution begins from hydrogen sulfide gas, a portion of which is fed directly to the upper part of the filling plate reaction vessel 3. A second portion is burned in the furnace 1 into sulfur dioxide, which is conducted to the upper part of the filling plate reaction vessel 3 through a cooling device 2. In addition, a nozzle 8 is installed in the upper part of the filling plate reaction vessel 3. Water which will act as the circulating liquid is sprinkled on the filling plates through the nozzle. The gases and the liquid flow with the current through the reaction vessel 3 and are removed from its lower part after the gas has been separated from the liquid phase.

The hydrogen sulfide and sulfur dioxide react in the reaction vessel 3 forming sulfur and water. The exhaust gases, which may contain components that have not yet reacted, will then be conducted through a special washing device 4, in which the gases are washed with white liquor, which is returned to the cooking process to reduce losses of chemicals.

The sulfur suspension is conducted from the reaction vessel 3 to a filter or concentrator 6, from where part of the circulating liquid is returned to the upper part of the reaction vessel 3 through the cooling device 5. The concentrated suspension, the concentration of sulfur in the suspension being more than 20 per cent of weight, advantageously about 50–60 per cent of weight, is then fed into the reaction vessel 7, in which it is made to react with a strong sodium sulfide solution to form polysulfide solution.

Example

In a balanced feed run on a laboratory scale the sulfur yield in the process has been 78.5 per cent. The result will be much better when the method is carried out on an industrial scale, in which case it is easier to use an exact feed. In any case the components that have not reacted and that may appear in the exhaust gases can be absorbed to such an extent that no noteworthy losses of chemicals will take place, that is, they will remain under one per cent.

Highly concentrated sulfur suspension with about 63 per cent of weight in sulfur, has been obtained by adding $Na_2SO_4$ into the circulating liquid so that the concentration of this salt in the circulating liquid has been some 15 grams per one liter. The same result has been obtained with 8 grams $Na_2SO_4$ per one liter of circulating liquid, when the temperature of the circulating liquid has been kept at some 50°–60°C.

The small amount of sodium sulfate coming into the polysulfide solution will be made use of later and the thio compounds in the polysulfide solution will circulate, inactive, in the system until they become reduced in the soda boiler.

What is claimed is:

1. Method of preparing polysulfide solution to be added to cellulose cooking liquor which comprises:
   a. reacting hydrogen sulfide and sulfur dioxide with each other in a water phase at a temperature not exceeding 150° C to form a sulfur suspension;
   b. conducting the sulfur suspension from step (a) through a concentrator to increase the sulfur content of the suspension to over 20% of weight and form a clear solution on this concentrated suspension;
   c. recirculating the clear solution from step (b) to step (a) and adding a small amount of sodium sulfate into the clear circulating liquid in order to speed up the sedimentation of sulfur; and
   d. reacting the concentrated sulfur suspension from step (b) with a sodium sulfide solution to obtain the polysulfide solution.

* * * * *